(12) United States Patent
Greenberg

(10) Patent No.: US 12,711,937 B2
(45) **Date of Patent: *Aug. 18, 2026**

(54) ROTOR CRAFT NOISE CANCELLATION SYSTEM AND METHOD

(71) Applicant: Alan Richard Greenberg, Los Angeles, CA (US)

(72) Inventor: Alan Richard Greenberg, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/753,708

(22) Filed: Jun. 25, 2024

(65) Prior Publication Data

US 2025/0022451 A1 Jan. 16, 2025

Related U.S. Application Data

(63) Continuation of application No. 18/136,308, filed on Apr. 18, 2023, now Pat. No. 12,033,608, which is a continuation of application No. 17/492,617, filed on Oct. 3, 2021, now Pat. No. 11,657,795, which is a continuation of application No. 17/067,589, filed on Oct. 9, 2020, now Pat. No. 11,164,553, which is a continuation of application No. 16/450,926, filed on Jun. 24, 2019, now abandoned.

(51) Int. Cl.

| | |
|---|---|
| ***G10K 11/178*** | (2006.01) |
| ***B64C 39/02*** | (2023.01) |
| ***B64U 10/13*** | (2023.01) |
| ***B64U 20/20*** | (2023.01) |
| ***B64U 30/29*** | (2023.01) |
| *B64U 20/10* | (2023.01) |
| *B64U 30/20* | (2023.01) |
| *B64U 50/14* | (2023.01) |

(52) U.S. Cl.

CPC .......... *G10K 11/178* (2013.01); *B64C 39/024* (2013.01); *B64U 10/13* (2023.01); *B64U 20/20* (2023.01); *B64U 30/29* (2023.01); *B64U 20/10* (2023.01); *B64U 30/20* (2023.01); *B64U 50/14* (2023.01); *G10K 2210/1281* (2013.01)

(58) Field of Classification Search

CPC ......... G10K 11/178; G10K 2210/1281; G10K 2210/121; G10K 2210/109; B64U 20/20; B64U 30/29; B64U 10/13; B64U 20/10; B64U 50/14; B64U 30/20; B64C 39/024

See application file for complete search history.

(56) References Cited

U.S. PATENT DOCUMENTS

2017/0243574 A1* 8/2017 Wu .................. G10K 11/17823

* cited by examiner

*Primary Examiner* — Jason R Kurr

(74) *Attorney, Agent, or Firm* — Olivo IP Law Group P.C.; John W. Olivo, Jr.

(57) ABSTRACT

Rotor noise cancellation through the use of mechanical means for a personal aerial drone vehicle. Active noise cancellation is achieved by creating an antiphase amplitude wave by modulation of the propeller blades, by utilizing embedded magnets through an electromagnetic coil encircling the propeller blades. A noise level sensor signals the rotor control system to adjust the frequency of the electromagnetic field surrounding the rotor and control the speed of the rotor. An additional method comprises of incorporating a phase lock loop within the control system configured to determine the frequencies corresponding to the rotors and generate corrective audio signals to achieve active noise cancellation.

20 Claims, 3 Drawing Sheets

100
102
CONTROL SYSTEM
NOISE CONTROLLER
104
106
116
ELECTROMAGNETIC COIL
110
102
114
MAGNET
100
112
118
SENSOR
108
ANTI-NOISE
120
NOISE
122
CANCELLED NOISE
124
+
=

ROTOR CRAFT NOISE CANCELLATION SYSTEM AND METHOD

CROSS REFERENCE TO RELATED APPLICATIONS

This application is a continuation of U.S. patent application Ser. No. 18/136,308, filed on Apr. 18, 2023, which is a continuation of U.S. patent application Ser. No. 17/492,617, filed on Oct. 3, 2021, and issued as U.S. Pat. No. 11,657,795, on May 23, 2023, which is a continuation of U.S. patent application Ser. No. 17/067,589, filed on Oct. 9, 2020, and issued as U.S. Pat. No. 11,164,553 on Nov. 2, 2021, which is a continuation of U.S. patent application Ser. No. 16/450,926, filed on Jun. 24, 2019, the contents of which are incorporated herein.

TECHNICAL FIELD

The present invention concerns rotor noise cancellation and, more specifically, systems and methods for eliminating rotor noise for aerial, land, and water vehicles or drones.

BACKGROUND OF THE INVENTION

Active Noise Control (ANC) is a method of reducing unwanted noise by actively generating an anti-sound, cancelling out the noise by means of an effect called phase cancellation or destructive interference. The noise, like any sound, is composed of alternating compression and rarefaction phases, which the human ear perceives as sound. By creating an inverted sound, with a rarefaction phase during the noise's compression phase and vice versa, the noise pressure wave is cancelled out, reducing the noise. Rotor based systems pose the extra challenge of producing rotating pressure fields that exhibit a highly complex phase structure and are thus very difficult to cancel out using ANC.

The three main components of active noise cancellation are power, phase and position. Without addressing all of these, it is not possible to achieve good attenuation of all noise frequencies, in all directions. To reduce noise successfully, the noise reduction component needs to be able to generate and absorb sound within the entire targeted frequency span. Without correct phase, noise suppression will not work.

Noises emanating from a rotor system have a very complicated phase structure. The noise is not only generated by the rotor blades but also by the interaction of the rotating flow with surrounding components. To actively reduce noise, the anti-noise source needs to be inserted in the heart of the flow. When using ANC, position is vital. A noise source targeted with ANC, will have noise maxima and minima unless the noise and anti-sound can be successfully joined.

Common ANC uses microphone to assess phase and a speaker to project an antiphase in order to produce destructive oscillation waves to cancel out noise. A system may use an oscillation sensor or microphone in order to produce an antiphase by oscillating the blades of the rotor in 180 degree opposing frequency and period of the oscillation generated by the rotor fan blades.

ANC is a technique most often used to control sound levels in small spaces such as the ear cavity of noise cancelling headphones. ANC technology functions by processing the sound waves around the device and using a speaker to emit identical waves but with an 180 degree phase shift. Sound travels through the air as a pressure wave that behaves like the sine function. The peaks of the wave are pockets of high-pressure air, and the troughs are pockets of low-pressure air. Shifting the phase 1800 causes the peaks of the original wave to align with the troughs of the modified "anti-noise" wave. When a low-pressure pocket aligns with a high-pressure pocket, they cancel each other out, reducing the noise level.

Since it is impossible to receive a sound wave signal through a microphone, process it, and instantaneously play it back with a 180-degree phase shift, it is necessary for an ANC algorithm to predict the phase of the sound it cancels at the time that the speaker output occurs. A frequently used method for determining the correct output is the least mean square (LMS) adaptive error correction algorithm. The algorithm calculates the speaker output by summing the product of a series of inputs and a series of weights corresponding to each input. The weights are adjusted in each iteration of the loop based on the input from previous iterations of the loop, a preset constant used to tune the algorithm, and past output error. Over the course of several thousand iterations, the system can learn to produce the desired output very accurately.

ANC is considered to be more effective because it can be adapted to any rotor system with low power consumption. In the past, sound regulation has not been enforced due to limited use of rotor craft, future rotor craft traffic will only increase, vehicles will grow in both size and number, as a result, noise pollution control will become a requirement, especially in dense urban centers. New technical implementations that could allow this to occur include the progress in the development of advanced battery technology, and reduced prices due to the economies of scale production, will make these rotor craft common place in daily life.

For years, the drone market was in a nascent phase and had yet to break into the mainstream. Then, in 2015, drone industry growth took a major step forward when the Federal Aviation Administration (FAA) granted hundreds of new exemptions for companies to operate drones in the U.S. These exemptions included several new use cases in multiple industries, such as insurance, construction, and agriculture. Each of these scenarios demonstrate the broad range of commercial applications for drones.

The FAA helped push drone market growth forward by formulating a regulatory framework with its consumer drone registry. Drone manufacturers and tech suppliers are doing all they can to capitalize on this and turn drones into a full-fledged industry. According to the research firm Gartner, Total drone unit sales climbed to 4.2 million worldwide, and revenue surged 36% to $4.5 billion in 2016 alone. In addition, Consumer Technology Association points out that 2.4 million personal drones were sold in the U.S. alone in 2016, more than double the 1.1 million sold in 2015.

While these indicators show that the popularity and use of drones is gradually increasing, a major tradeoff related to drone usage is the noise pollution associated with them. Specifically, the high-pitched sound associated with drones has started to become the central issue in many debates. Importantly, A 2017 study by the National Aeronautics and Space Administration ("NASA") has found that individuals find drone noise to be more of a nuisance than that of any ground vehicles. In fact, even where the two objects are placed at a similar volume, an entire set of 38 random individuals claimed that the drone noise was more of an irritant than other noises.

Currently, there is a need to reduce the noise generated by drones. This can provide multiple benefits, including a stealth use for drones while serving societal purpose of noise reduction. The invention contemplated herein seeks to provide that solution.

The noise generated by Unmanned Aerial Vehicles (UAV) can be caused by: the propulsion system converting the energy of the fuel into the thrust; the flow of the air around the fuselage; and the vibration of the structure as a result of the propelling force. The noise of the propulsion system is significant during the typical flight of the UAVs. Fuel cell electrically powered UAVs operate more efficiently and create less vibration and noise compare to combustion or gas UAVs, especially at high altitude operations. The turbo charger of the combustion engines is generally used during the high-altitude operations. The fuel cell systems drawback is their low power density compare to conventional fuels. Extra back up batteries may be used to overcome this weakness.

The propulsion system of the UAV creates structural vibrations. In addition, gusts of wind, fluctuation of temperature at the different parts of the aircraft, high altitude radiation effects on composite materials also create added vibrations. These vibrations generate noise. Often times, the approach to noise reduction is through finding ways to absorb the structural vibrations. However, this is a double-edged solution, since vibrations may often be used for better energy dissipation.

One of the simplest methods of limiting UAV noise is weight reduction. If the mechanisms and electronics the propellers must lift are lighter, less thrust is required, and the motors may be run more slowly. Propellers and motors are quieter when run more slowly because they cause lesser internal vibrations of the vehicle and weaker disturbances in the air. The design and material of the propeller can also contribute to the sound produced by a UAV. Larger, slower propellers are often quieter than smaller, faster spinning designs. Also, more efficient propellers need not be run as fast in order to produce sufficient lift and may therefore produce less noise. Similarly, if an external device such as a shroud increases the efficiency of the propulsion system, this may also reduce the noise level. Propellers are shaped and angled such that a lower-pressure region develops above the propeller and a higher-pressure region develops below the propeller. The higher-pressure air on the bottom pushes the propeller upwards. However, instead of generating lift, the high-pressure air underneath can also flow around the tip of the propeller blade to reach the low-pressure region above the propeller, and turbulent air currents can form. Well designed, close fitting shrouds can limit these propeller tip vortices which are often responsible for considerable noise and inefficiency.

SUMMARY OF THE INVENTION

In accordance with the present invention, ANC is achieved by creating an antiphase amplitude wave by modulation of the propeller blades rotation, by utilizing embedded magnets through an electromagnetic coil encircling the propeller blades. The embedded magnets may be affixed to the propeller blades after the manufacture of the propeller blades or may be designed to be manufactured within the propeller blades. By modulating the rotation of the blades in response to sensing the noise produced by said rotation, the amplitude of the noise may be reduced.

In one embodiment, an electromagnetic coil is added to the inner rotor frame encircling the rotors, and magnets are fixed to the end of each rotor. This causes the rotors to emit the anti-noise signal through minute modulations of the propeller blades, which are achieved by switching on and off a coil within the rotor frame that interacts with magnets inside the blade tips. This method results in ANC through mechanical means. The anti-noise comes from the exact same position as the original noise and precisely matches its phase and rotation pattern and can be applied to omnidirectional rotors.

In the preferred embodiment, two microphones are installed directly across from one another on the inner rim that encircles the rotors, for sensing or listening to the propeller blades as they rotate. ANC is produced with a combined electronic field, and its associated magnetic field, and microphone element, comprising a motor driven rotor. The rotation of the rotor in the air is superimposed to a sound-pitch modulation corresponding to a desired sound generation by the rotation of the rotor with said sound pitch. By alternating the rotor blades for pushing the air (positive compression) towards the listener and in the opposite direction respectively (negative compression) from the listener, the same compression conditions are achieved as the propellers vibrate. By altering the sound-pitch, extremely low frequency sounds can be generated, even below the audible range. The momentary sound pressure of the sound is thus controlled by means of an electric signal to the electromagnet around the rotor for control of the sound-pitch of its negative signal—negative pressure and flow and positive signal—positive pressure and flow. This method results in ANC through use of an electromagnetic wave applied across the rotating propellers and their associated magnets. The sound level of the generated sound can either be controlled by different rotor angles or by varying the rotational speed, since both measures can influence the sound pressure and the transported amount of air in each sound wave.

In the preferred embodiment, the system includes one or more microphones or oscillation sensors fixed to the inner rotor frame and configured to capture an audio signal or oscillation phase. These microphones or oscillation sensors are configured to determine one or more frequencies corresponding to the one or more rotors and generate one or more correction signals corresponding to a dynamic sum of the one or more frequencies and generates a second audio signal or oscillation by combining the one or more correction signals or oscillations and the first audio signal or oscillation. Through the use of a rotor for controlling an oscillator which in turn controls the electrical signal supplied through the coils which surround the rotor frame. By allowing the rotor blades to be freely moveable, the rotor rotation can be controlled by the sound inducing airflow back and forth through electrical means that can detect the angle displacement of the rotors.

The disclosed embodiments can be retrofitted to existing rotor blades, after the rotor craft has been manufactured. In lieu of microphone, an oscillation sensor can be added. This will mitigate noise interference from wind and other exterior elements. With an algorithm that compensates for rotations per minute (RPM) and air density and speed, a microphone will only be used as a sensing mechanism to control the electronic oscillator to control the production of the electronic field through the coils surrounding the rotor. A phase-locked loop system can be provided. A phase lock loop (PLL) is a control system that generates an output signal whose phase is related to the phase of an input signal. There are several different types; the simplest is an electronic circuit consisting of a variable frequency oscillator and a phase detector in a feedback loop. Keeping the input and output phase in lock step also implies keeping the input and output frequencies the same. Consequently, in addition to synchronizing signals, a phase-locked loop can track an input frequency, or it can generate a frequency that is a multiple of the input frequency.

An electromagnetic coil can reduce noise by creating a destructive interference by oscillating the rotor blades imbedded with magnets 180 degrees out of phase. Using the Principle of Faraday's Law, the magnets attached to the ends of each rotor blade will pass through a coil of wire around the ducting for the rotor as they spin. An electrical current will be created as the magnet passes through the coil. To counteract the oscillation of the rotors, an inversely proportional current will be applied in the opposite direction to the coil which will negate the oscillation of the magnets by forcing the magnets to move 180 degrees out of phase, thereby creating a destructive interference.

When a magnet travels through a coil of conductive wire, an electrical current is produced, and as the rotor with imbedded magnets oscillates in a coil it will generate an electric current as well. The current in the coil will change direction as the poles of the magnet oscillate inside the coil. This current can be countered by adding another electrical current in the opposite direction. As a result, the motion of the magnet will be countered by the electromagnetic field generated by the coil, thereby canceling out noise created by the oscillation (vibration) of the rotor. The sound profile can also be changed to increase the noise by the same means, flowing current in phase with the rotors. This can also be used as a signaling device or landing caution warning.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE PREFERRED EMBODIMENT

Figure 1:
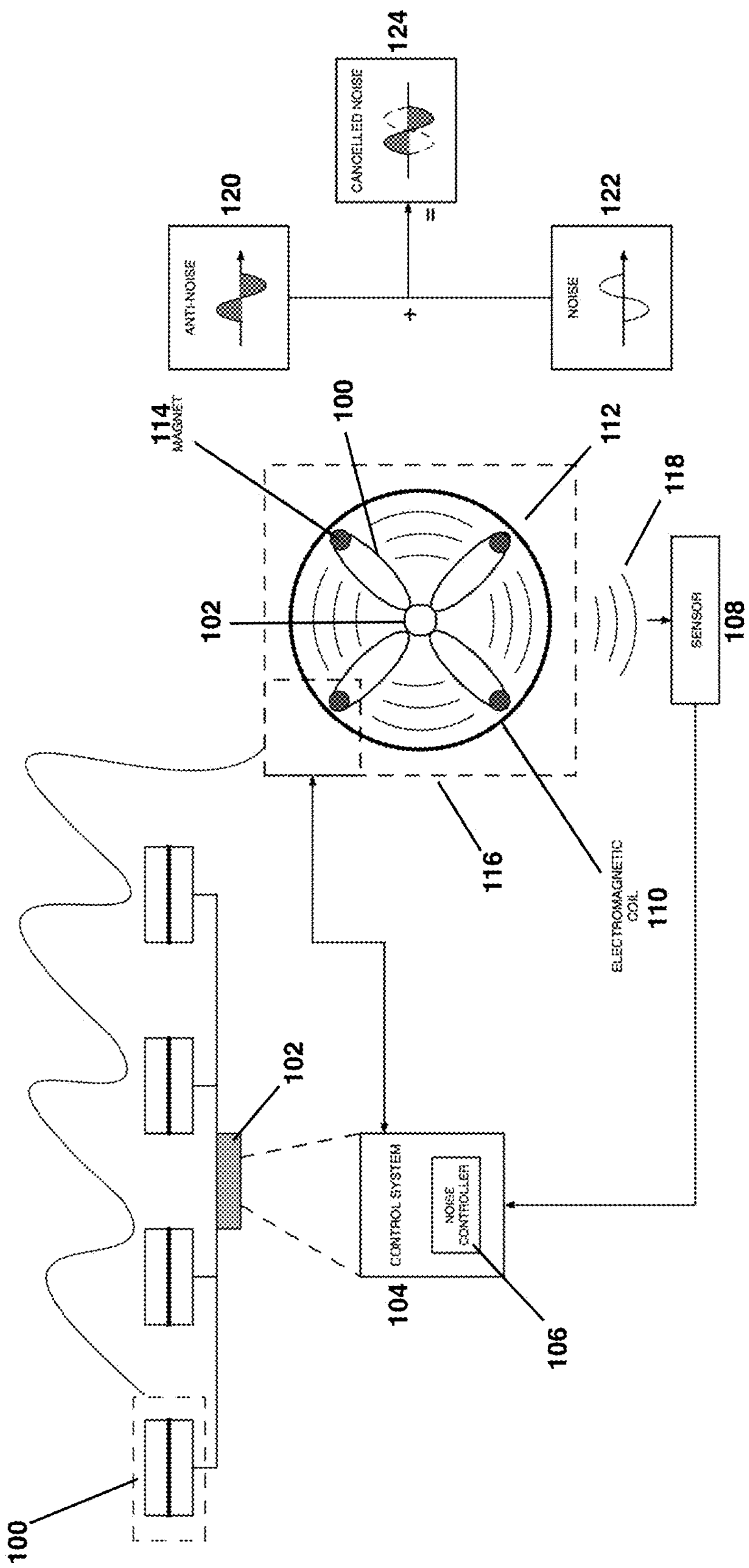
FIG. 1 is a diagram of the overall system of the present invention.

In the preferred embodiment of the present invention, ANC will work by energizing the perimeter coils with various wave functions to create an electronic field, in turn to create an orthogonal magnetic field that will act upon the magnets associated with each of the propeller blades or a subset of the propeller blades. The electronic wave functions may have varying waveforms, shapes, frequencies and may be modulated by various techniques well known by those of skill in the art. The rotating propeller blade housing may be manufactured with or supplemented by a series of windings, suitable for creating an electronic field and associated orthogonal magnetic field. In terms of the power of the electronic field or its amplitude, those of skill in the art will select various amplitudes sufficient in comparison to the weight and speed of the propellers to be modulated. Importantly, the present invention relies on a feedback loop. In normal operation, the fan blades are driven by a motor and produce noise. According to the present invention, the blades include magnets and a series of electronic coils surrounding the fan blades and associated magnets. In addition, the present invention includes a microphone which "listens" to the noise produced by the rotating fan blades, and then, a control system measures said noise and generates and applies a waveform across the electronic coils. In other words, the control system generates a signal resulting in an electronic field being generated along the electronic coils. In turn, the electronic coils produce a magnetic wave perpendicular to the electronic field, wherein said magnetic wave acts upon the magnets on the fan or propeller blades. That magnetic field causes a phase shift in the noise propagated by the rotating blades, and in turn, the microphone picks up that shift and then, the control system varies the electric field until the noise propagated is minimized. Once said minimum is obtained, a phase lock loop feedback circuit may be used to maintain that state.

Antiresonance is a pronounced minimum in the amplitude of one oscillator at a particular frequency, accompanied by a large shift in its oscillation phase. These frequencies are known as antiresonant frequencies, and at these frequencies, the oscillation amplitude can drop to almost zero. Antiresonances are caused by destructive interference, for example between an external driving force and interaction with another oscillator. The reduced oscillation amplitude at an antiresonance can be regarded as due to destructive interference or cancellation of forces acting on the oscillator. An important result in the theory of antiresonances is that they can be interpreted as the resonances of the system fixed at the excitation point. By utilizing differential equations, one of skill in the art can calculate what wave will zero out another wave, and consequently, vary the rotational motion characteristics so that said waves cancel each other out so that the overall noise emitted from the device is at an absolute minimum. Then, a phased locked loop circuit can be used to "lock in" said minimum noise. The antiresonances of a system are independent of the properties of the driven oscillator, and they do not change if the resonance frequency or damping coefficient of the driven oscillator are altered. This result makes antiresonances useful in characterizing complex coupled systems which cannot be easily separated into their constituent components. The resonance frequencies of the system depend on the properties of all components and their couplings and are independent of which is driven. The antiresonances, on the other hand, are dependent upon the component being driven, therefore providing information about how it affects the total system.

FIG. 1 is a diagram of the overall system of the present invention. In accordance with the preferred embodiment of the present invention, the rotor blades 100 are connected to an oscillator motor 102. The oscillator motor 102 is linked to a control system 104 that controls the speed of the oscillator motor 102. A noise controller 106 component of the control system 104 uses a PLL to generate and maintain an output signal phase in relation to the phase of an input signal, as a reaction to signals transmitted from a sensor 108. The rotor blades 100 are surrounded by an electromagnetic coil 110 that lines the inner wall of the rotor frame 112. Each rotor blade 100 is embedded with a magnet 114. When the oscillator motor 102 spins the rotor blades 100, an electromagnetic field 116 is generated between the electromagnetic coil 112 and the magnets 114. The sensor 108 detects the noise level 118 produced by the spinning rotor blades 100. The sensor 108 signals the noise controller 106 to adjust the speed of the oscillator 102 through the control system 104. The control system 104 can adjust the electromagnetic field 116, thereby controlling the magnetic charge 114 and altering the speed of the rotating blades 100. The resulting electromagnetic field 116 effectively generates an anti-noise wave with a variable wavelength 120. When combined with the normal noise of wavelength 122 created by the oscillator motor 102 and rotor blades 100, the anti-noise wavelength 120 cancels out the noise (cancelled noise 124), thereby producing ANC.

Figure 2:
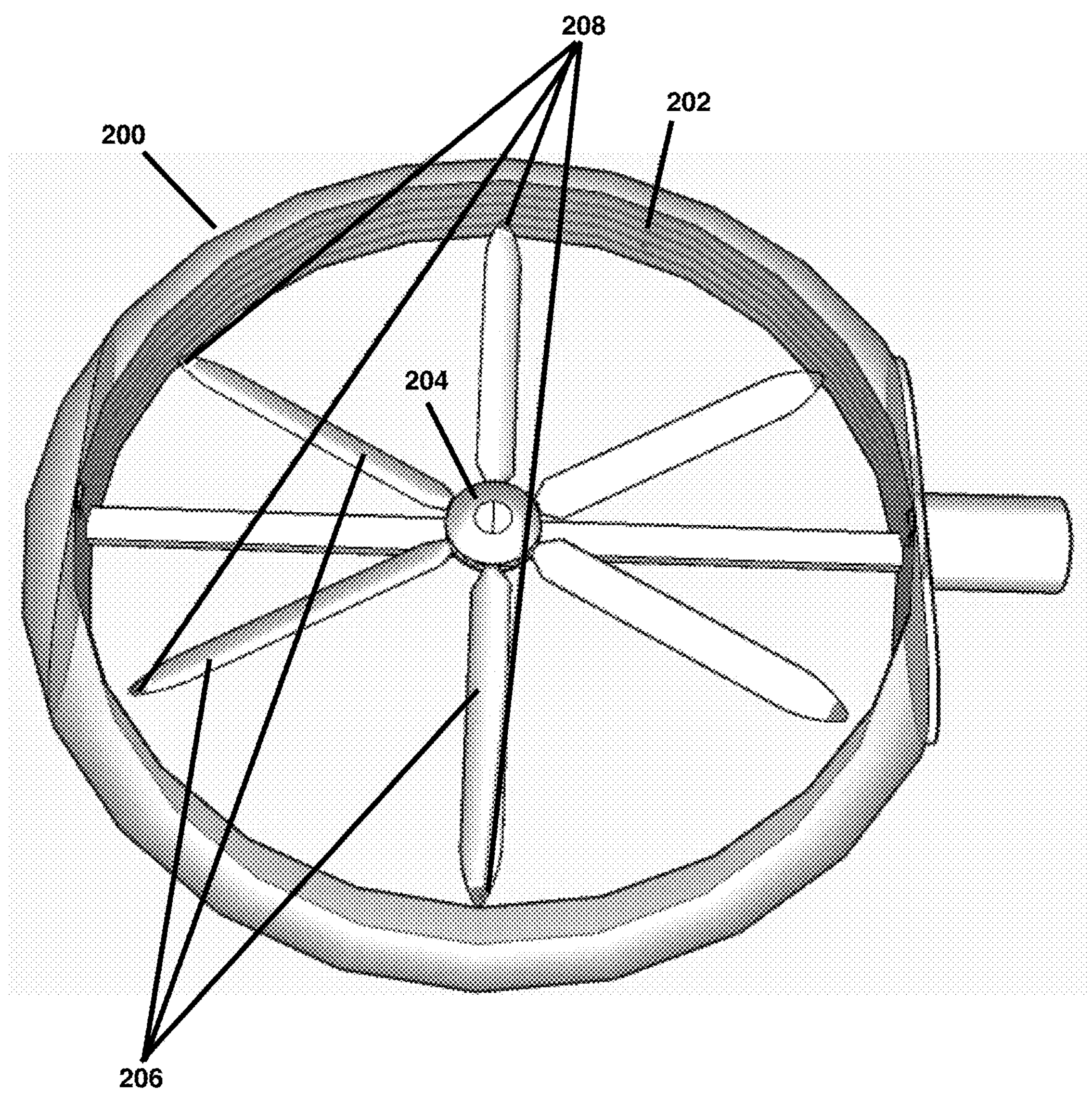
FIG. 2 is a rendering of the rotor embodiment of the present invention.

FIG. 2 is a rendering of the mechanical noise cancellation component of the present invention. In accordance with the preferred embodiment of the present invention, the rotor 200 wall is lined with an electromagnetic coil 202. Located at the center of the rotor 200, is a motorized hub 204 controls the propeller blades 206. The tip of each rotor blade 206 has an embedded magnet 208. These magnets create an electromagnetic charge through the coil 202, generating an electromagnetic field and creating an antiphase amplitude wave to modulate the propeller blades 206 and achieve ANC. Importantly, control system 104 may "learn" what wave functions produce ANC, so that for various configurations of fan blades, weights and environmental conditions, ANC may be achieved at all times eventually. Because the present invention uses a sensor or microphone or series of each 108, real life conditions may be processed, and a minimum noise profile developed for each fan blade—rotor combination. And once an optimal noise condition is obtained, a PLL may be utilized within the control system 104 and noise controller 106 to maintain that state.

Figure 3:
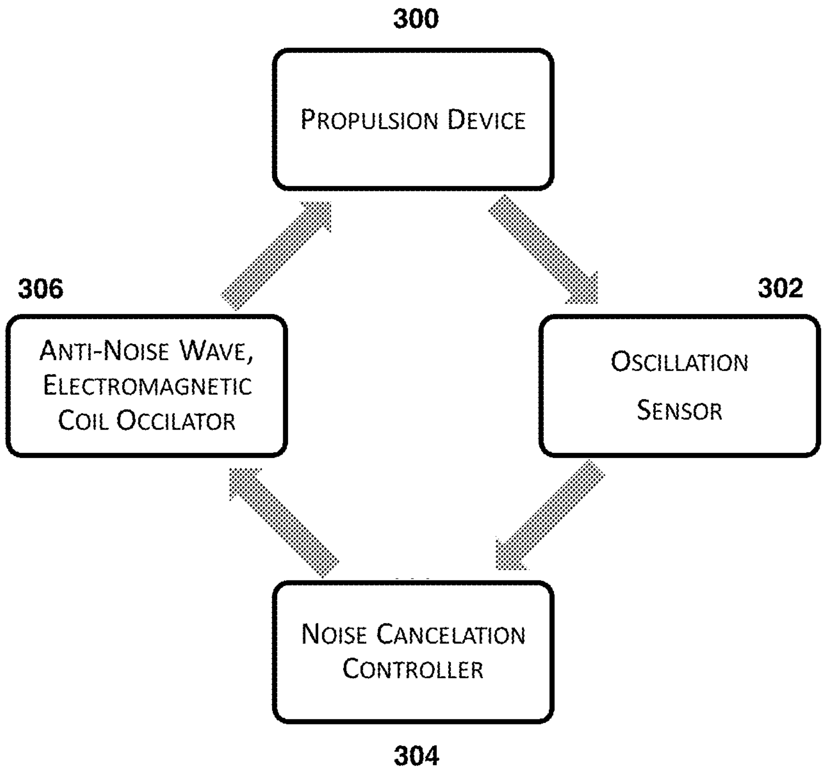
FIG. 3 is a flow diagram of the ANC embodiment of the present invention.

FIG. 3 is a diagram of the overall feedback system according to the present invention, which constitutes the controller of the propulsion sensor controller oscillator of the present invention. In accordance with the preferred embodiment of the present invention, a propulsion device 300 is connected to an oscillation sensor 302. The oscillation sensor 302 communicates with a noise cancellation controller 304. The noise cancellation controller 304 generates an anti-noise wavelength within the electromagnetic coil oscillator 306. The anti-noise wavelength generated from the electromagnetic coil oscillator 306 controls the propulsion device 300. Accordingly, the magnets spinning themselves generate a magnetic field which translates to an electronic field which the oscillation sensor 302 may react to; or, the noise cancellation controller 304 may generate an electronic field to create an anti-noise wave, electromagnetic coil oscillator signal 306 to act upon the propulsion device 300. While the arrows shown depict the order of operation, it is true that the process may run in both directions so that the magnets 114 are both generators of energy and may be acted upon as they rotate by the coils 202 contained within coil unit 110. In both instances, the goal is a minimal output of noise which a PLL can be used to lock in. In this manner, it is equally true that the magnets 114 induce electrical currents along the coils 202 that may be used to charge batteries associated with powering motorized hub 204 and conversely, the coils 202 may be energized to create a magnetic field for retarding the movement of the magnets 114 to alter the fan blade rotation for achieving ANC.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof, the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A method for noise reduction in connection with a rotating fan system with propellers wherein said propellers include magnetic portions and wherein said magnetic portions interact with an electromagnet wherein said propellers produce noise and vibrations, the method comprising:

sensing the noise and vibrations produced by the propellers;

triggering modulation of the rotation of propeller blades, wherein rotation is optimized in terms of positive and negative compression towards and away from a listener, and wherein said propellers rotated by a motor independent of energy generated by said electromagnet, wherein said sensing occurs via microphone installments to an inner rim of the propellers encircling a rotor such that as the propeller blades rotate they are noise sensed;

creating interference using the electromagnet acting upon said rotation of said propellers so that said interference acting upon said rotation of said propellers is controlled so as to enable said propellers to maintain a desired rate of rotation, wherein said interference is the result of generating an antiphase amplitude wave, and wherein a desired rate of rotation can be achieved by control of rotor angles or varying rotational speed to influence sound pressure and a transported amount of air in each sound wave.

2. The method of claim 1 wherein said propellers are manufactured with magnetic portions embedded within an electromagnetic coil, the coil being mounted to a inner rotor frame which encircles a plurality of rotors, with magnets fixed to the ends of said rotors.

3. The method of claim 1 wherein magnets are attached to said propellers.

4. The method of claim 1 wherein electronic waves are input to said electromagnet to modify movement of said propellers and include a feedback system so as to reduce said interference in proportion to environmental conditions and for comparatively reducing noise in proportion to maintaining a desired rate of rotation of said propellers.

5. The method of claim 1 wherein interference is produced in a manner to achieve variable said noise reduction.

6. An aerial drone with propeller noise reduction including reducing propeller noise by magnetizing propellers, the aerial drone comprising:

an electromagnet for creating interference acting upon a rotation of said propellers and applying an orthogonal magnetic field to an electrical field of said propellers to cancel noise;

a motor for rotating said propellers independent of energy generated by the electromagnet;

an oscillation sensor for mitigating noise interference from wind and exterior elements by compensating for rotations per minute, air density and speed;

wherein said rotating propeller system reacts in proportion to said interference acting upon said rotation of said propellers; and wherein a produced antiresonance is independent of oscillator properties which controls said electric field.

7. The aerial drone of claim 6 wherein said propellers are manufactured with magnetic portions.

8. The aerial drone of claim 6 wherein magnets are attached to said propellers.

9. The aerial drone of claim 6 wherein an electronic wave is input to said electromagnet to modify the movement of said propellers and include a feedback system so as to maintain a desired rate of rotation of said propellers wherein the magnets can be both generators of energy and may be acted upon as they rotate by electromagnetic coils.

10. The aerial drone of claim 6 wherein said interference is produced in a manner to achieve variable noise reduction.

11. A rotating fan system with propellers disposed upon an aerial drone wherein said propellers include magnetic portions and wherein said magnetic portions interact with an electromagnet wherein said propellers are rotated by a motor independent of energy generated by said electromagnet and wherein said electromagnet creates interference acting upon said rotation of said propellers, wherein said rotating fan system includes a position shift detector of said aerial drone so that said interference acting upon said rotation of said propellers is minimized so as to enable said aerial drone to maintain a steady position above a terrestrial target of interest.

12. The system of claim 11 wherein said propellers are manufactured with magnetic portions.

13. The system of claim 11 wherein magnets are attached to said propellers.

14. The system of claim 11 wherein electronic waves are input to said electromagnet to modify the movement of said propellers and include a phase lock loop system so as to reduce said magnetic interference in proportion to said wind or other environmental conditions and for comparatively reducing noise in proportion to maintaining a steady position of said aerial drone above said terrestrial target of interest so as to minimize said noise but to sacrifice said noise reduction just enough to maintain said position of said aerial drone above said terrestrial target of interest.

15. The system of claim 11 wherein said interference is produced in a manner to achieve noise reduction.

16. The system of claim 15 wherein said noise reduction is maximized by varying said magnetic interference so as to minimize overall noise amplitude produced by said system during use.

17. The system of claim 15 wherein active noise cancelation ANC is used to reduce said noise.

18. The system of claim 15 wherein microphones are used to sense said noise.

19. The system of claim 11 wherein a sound level of generated sound can either be controlled by different rotor angles or by varying the rotational speed for influencing sound pressure and an amount of transported air in each sound wave.

20. The system of claim 19 wherein an algorithm that compensates for rotations per minute (RPM) and air density and speed controls an electronic oscillator which in turn controls production of an electronic field through coils surrounding a propeller rotor.

* * * * *